Figure 1:
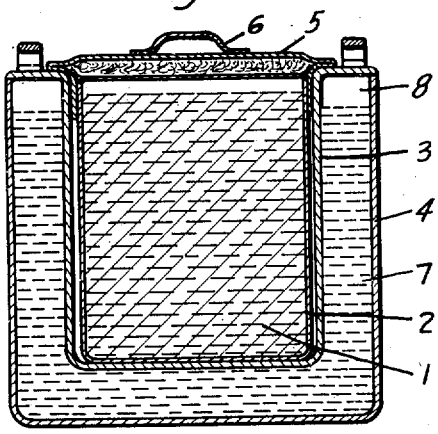

Oct. 14, 1930. E. THOMSON. Re. 17,826

COOLING CONTAINER.

Original Filed Jan. 5, 1920

Inventor:
Elihu Thomson,
By John G. McManus, Jr.
Att'y

Reissued Oct. 14, 1930 Re. 17,826

UNITED STATES PATENT OFFICE

ELIHU THOMSON, OF SWAMPSCOTT, MASSACHUSETTS, ASSIGNOR, BY MESNE ASSIGNMENTS, TO THE GLACIFER CORPORATION OF DELAWARE

COOLING CONTAINER

Original No. 1,369,367, dated February 22, 1921, Serial No. 349,412, filed January 5, 1920. Application for reissue filed June 4, 1930. Serial No. 459,232.

The object of my invention is to provide a container for transporting and preserving products such as ices, ice cream and the like to be maintained below their melting point, the inner temperature of which container at all times while in service for its purpose is below, or at least never so high as that of the product to be preserved in the container at a substantially initial temperature at which it is put into said container. An example of the use of such a container is the preservation and delivery of a frozen body such as ice cream which can be prevented from receiving heat or can be maintained below its freezing point until it is removed for use, which may be at the expiration of hours or even one or more days.

Another object of my invention is to provide additional means for efficiently jacketing my improved primary container by a secondary enveloping heat non-conducting device which may take the form of a heat non-conducting blanket or jacket for the primary container, or which may be embodied in a secondary container or thermal insulated receptacle in which the first or primary container is inserted and efficiently closed thereby, or so covered as to prevent the absorption or conduction of heat from the outside. This additional jacketing or this secondary container or receptacle may be employed only when it is desirable to lengthen the period of preservation of the product or products in the primary container, such as when said container is to be transported for relatively long distances or to be kept for a longer period of time than would be involved in the use of the primary container alone. It is an important object of my invention to so construct the container for receiving the product to be preserved that it shall be a permanent piece of apparatus not requiring renewal of its contents, but capable of being (by suitable treatment) used over and over again indefinitely. It is, of course, customary to surround a vessel containing a cold product such as ice cream with a space in which there is packed a refrigerating mixture such as ice and salt, the melting of which (by heat leakage from the outside) takes place, no matter how well protected, at a lower temperature than the freezing point of the contained product such as ice cream or ices. The disadvantage of this arrangement, however, is great, inasmuch as after every use thereof the briny mixture has to be removed by pouring out the brine or other mixture and placing therein another supply before the container can be used again. In my invention the frozen or cooled mass which protects the interior product from melting has, like the ice and salt, a lower melting point than such product, but it exists in a closed vessel kept closed during operation or otherwise, as there is ordinarily no need of opening it. It is prepared with its contents for use by simple external refrigeration in a suitable refrigerating apparatus before its use. If it contains (for example) a mixture of alcohol and water, the container is so cold before use as to freeze the water present with the alcohol, or if the box in this case contains a mixture of water and a dissolved salt, that is, a solution, this solution is made such that its freezing point is below that of the product contained in the inner space of the box, itself, to be preserved in a frozen state. The part of my apparatus, therefore, which is the most important and essential structure consists, naturally, or preferably, of an interior space surrounded by a double walled box or inclosure. The space between the walls can be sealed hermetically, having about 90% of its capacity filled with the solution or mixture before mentioned, of which there are numerous modifications or combinations. It is best to seal the box hermetically, after boiling and expulsion of air, thus avoiding corrosive action on the metal, free oxygen being absent. An inert gas might be used, but the procedure outlined gives a partial vacuum with only water vapor present. If such a box were made of copper it would be sufficient to have spaces formed in its walls for the reception of the freezing fluid or mixture mentioned. This space can be arranged in any desired form. One or more separate spaces can exist, but it will be most convenient to have an inner vessel set within, as it were, an outer vessel, leaving a fairly uniform space between the two, bottom and sides especially. This gives the simplest construction for such an apparatus. If the melting point of the solution or mixture contained within the double walled box is lower than that of the material such as ice cream to be carried or preserved within the interior space, then such product or contained ice cream will not begin to melt or show any signs of melting until the solution in the double walled box or container (which has before use been frozen) has almost completely melted within said box; that is, there could be a very considerable leakage of heat from the outside to such an apparatus without any destructive melting of the ice cream. This in no sense differs from the other method for preserving such a product as ice cream during transportation, but in my invention there is a saving of the necessity of manipulation for renewing the cooling medium outside the vessel containing the product itself; and this improvement constitutes the novelty of my invention, viz, that I make the cooling medium subject to use over and over again, and thereby constitute it as sealed up, without leakage, a permanent piece of apparatus. There is, of course, no throwing away or disposing of the brine; and there is no renewed use of salt or ice and no danger, therefore, of contamination of the ice cream, itself, through leakage with the salt brine outside thereof.

It is believed by applicant that this is a radical and novel departure. It is as if a solid and interchangeable block of heat absorbing stuff were interposed between the heat entering and the product, so as to intercept or impede to a high degree the entrance of any of the leakage heat into the product to be preserved, and this by virtue of its superior heat absorbing capacity, or as it may be termed, avidity for heat.

Figure 5:
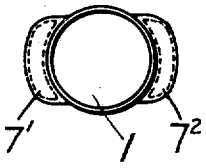
Figure 3:
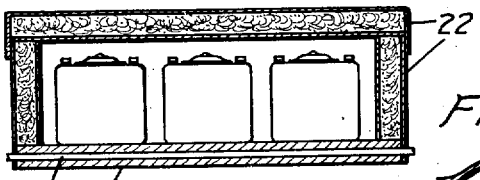
Figure 4:
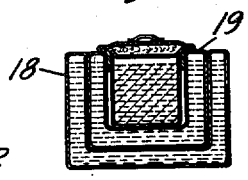
Figure 2:
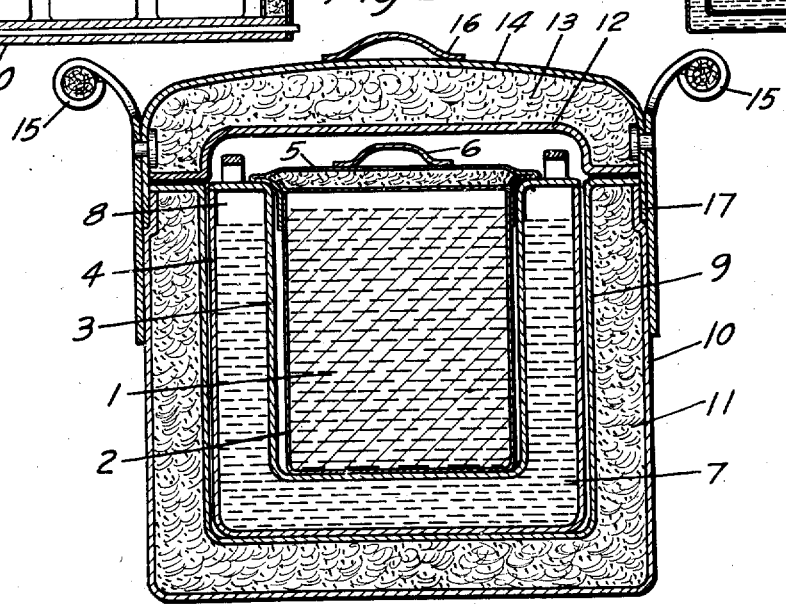

Referring to the accompanying specification and drawings, Figure 1 represents a vertical sectional elevation of the improved container of my invention; Fig. 2 is a vertical sectional elevation of a container showing a second container in which the first is inserted for better thermally insulating the first or primary container; Fig. 3 represents a longitudinal sectional elevation of a suitable refrigerating arrangement in which the containers are frozen for use; Fig. 4 represents a method of nesting the containers one within another for more efficiently thermally insulating the inner container in which the product to be maintained or preserved is kept; and Fig. 5 represents a modification of the means for receiving the cooling or freezing mixture. As an example of the construction which embodies my invention, reference may be made to Fig. 1 of the accompanying drawings where the space 1 is the inside space of the container into which a product such as ice cream or ices, which may be wrapped in paraffin paper when fairly well frozen, is introduced. Surrounding this or surrounding a separate vessel or wrapping which may be indicated by 2 is a double walled vessel, the inner wall of which is marked 3 and the outer wall 4, constituting both bottom and sides, inclosing a space which normally is sealed in use. The inner container 2 of thin metal may be dispensed with and the product put directly into the inner space inclosed by the inner wall 3. A lid may be provided, which is preferably double, and between its walls a good non-conductor is interposed such as eider-down, granulated cork, felt, or such like material. This lid is marked 5 and has a proper handle 6 for removing it at will and may have an extension at its edge downward to fit the vessel as a cover as usual with such appliances. The filling 7 between the walls 3 and 4 is established once for all of a mixture or solution. For some purposes the mixture can be made of alcohol and water in such percentages as the necessities of the case demand. The lower the temperature to be sustained, the more alcohol will be added. Instead of alcohol and water, glycerin and water may be mixed and introduced, or in other cases a solution of a salt and water, such as chlorid of sodium or sodium hyposulfite may be used; or sulfate of sodium, which latter are highly soluble salts, the percentages of the salts which are added to the water being proportioned in accordance with the freezing points of the material which it may be desired that such material should have. In general, the more salt present, the lower the temperature which may be maintained. It is essential in my invention to provide a space 8, which is best made nearly vacuous, and the volume of which space above the rest of the filling material 7 is great enough to allow a free expansion during the freezing of the filling 7, as will be explained. It is sufficient to boil the liquid, which contains as a solvent say water, and while the air has been driven out through a small opening, stop the boiling and immediately solder the opening, thus closing the vessel hermetically. This is by no means essential, but it is desirable. A screw cap with a close fitting washer could be provided and used to close the same after expelling air, or if the space 8 is very considerably enlarged and the material of the vessel is such as not to oxodize, then the expulsion of air is by no means so necessary, though in every case it is desirable. The filling or solution 7 should not be so clarified as to be free from nuceli upon which freezing may begin.

Assuming the apparatus Fig. 1 to be prepared in the way stated, it is now to be made ready for use. To do this it is subjected to a freezing process in a suitable apparatus whereby the heat is extracted from the filling 7 from below in the one case, or as a substitute therefor from the interior only to a great degree, or in any way such that the freezing of the filling solution 7 is progressively from one part of the surface toward the other without inclosing masses of unfrozen solution. If the extraction of heat is from below, the solidification or freezing of the salt and water goes on from below upward; and there is no danger of bursting or deforming the vessel by expansion. If the freezing takes place from the interior surface toward the exterior, the exterior being maintained above freezing until the very last, the same thing is true; or if the freezing takes place from the exterior toward the interior, as by cooling the outer surface and maintaining the interior surface 3 above the melting point until the very last of the freezing, no damage can occur. It is thought necessary to be specific in this respect, as it is contemplated to use in most instances, as the solution to be frozen, water, on account of its high heat of liquefaction. Other liquids or solutions might be used as fillers, instead of those mentioned, provided the space between the walls 3 and 4 is increased in volume as the latent heat of liquefaction lessens. If the liquid filler chosen to be frozen does not expand during freezing, then the precautions during freezing are not necessary. To maintain a substance such as ice cream, which freezes a number of degrees below the freezing point of water, in condition for use as solidly frozen it would be necessary to select for the filling 7 a liquid or solution which freezes below the melting point of ice cream, or what is the same thing, to select a liquid or solution which, when frozen, liquefies on the addition of heat thereto from the outside at a considerably lower temperature than the point of liquefaction of the contained material such as ice cream.

The statement just preceding means that the liquid freezing mixture is closed in a vessel and is such as will prevent freezing at 32° Fahrenheit, which would take place if water alone were there. At a temperature a few degrees below the freezing point of water, a small amount of congelation or freezing begins. The cooling may be continued at a considerably lower predetermined temperature than this, and the congelation continued from a few degrees below the freezing point of water to a temperature considerably below such freezing point, and a greater and greater proportion of the liquid mass in the vessel congeals. The necessary range of freezing, below the freezing point of water, depends upon the initial preservation point of the product to be preserved.

The apparatus Fig. 1 might be used, therefore, to transport a frozen compound, or transport any substance requiring to be maintained at a comparatively low temperature by first freezing the contained material 7, having placed therein before or after this process the material to be kept in the space 1. Placing on the cover 5 and wrapping the whole mass in a blanket or covering, which is of low heat conductivity, will be sufficient in many cases for maintaining the product in the space 1 for hours in proper condition. If the vessel composing the space 1 is of fairly high conductivity metal, or the walls are fairly stout, it will not be necessary that the space surrounding the same containing the filler 7 be completed as an inclosure, but it could be divided into sections or segments surrounding the interior vessel as indicated in plan Fig. 5 where two sets of segments 7′ and 7² are shown surrounding the interior space 1.

In regard to making a practical container and completing the device of my invention, I prefer to provide an outer covering or jacket of any construction which slows up the leakage of heat from the exterior to the inner vessel containing the frozen filling 7. In other words, I prefer to place this vessel, with the filler, inside another vessel, the walls of which are, however evacuated as in a thermos bottle, or are stuffed with a certain thickness of such material as felt, eider-down, cork or the like. It is, however, one of the important and practical features of my invention that no such thing as a high-grade thermos evacuated receptacle is necessary, inasmuch as the frozen filler 7 can absorb considerable leakage of heat without any damage to the interior contents contained. Hence, it suffices to inclose for transportation purposes the device 1, 3 and 4 in an outer box or jacket, the inner surface of which may be indicated by say a thin wall of such material as varnished card 9, Fig. 2. Directly surrounding the inner walls 9 and inside the outer wall 10 is stuffed or filled therein a porous non-conductor, one or another, such as mentioned. The lid or cover 12, 13 and 14 is the same in make-up. The inner wall 12 for maintaining the lining 13 may consist of paper or other similar material, or even be dispensed with altogether. The packing is indicated at 13 and the outer cover at 14, proper handles 15 and 16 being provided for manipulation, and the edge of the cover at 17 may fit over the outer vessel as a convenient way of uniting the two for carriage; and of course it follows naturally that a lock or screw joint or any means of maintaining the two together may be provided so that they do not come apart except at the will of those concerned in opening the vessel.

With the provisions as so arranged it is possible to maintain frozen masses of ices or ice cream against heat leakage from the exterior, the period of preservation depending upon the amount of material 7 which has to be melted before the melting of the interior charge in the space; and, of course, it will also vary with the freezing point of the material and general properties of the material to be preserved. A product such as ice cream may be necessary to be kept frozen for a longer period, and in this case it may be desirable to have a container 19, Fig. 4, and an outer container, say marked 18, Fig. 4, as a jacket around the inner container 19, both having the construction shown in Fig. 1, and both having been treated in the same way in freezing.

To prepare these vessels such as Fig. 1 for use it is only necessary to subject than either singly or in groups to any proper freezing process, which, as has been described, may consist in abstracting the heat progressively from one part of the container, such as the outside or the inside, or from the bottom upward, so that the freezing begins at one part, and, as expansion takes place, displaces the liquid upward and so avoids developing pressure within the body of fluid surrounded by solidified material, which would tend to burst or distort the vessel. I have found that if the freezing of a contained liquid such as a salt solution, or even water itself, takes place from one part of a vessel to the other as from the outside to the inside or vice versa, so as not to pocket any unfrozen masses, the expansion during freezing does no harm, provided a space above the liquid is allowed for such expansion in the completely closed vessel. The same is true in an open vessel, where there is no objection to leaving it open; but for the purposes of my invention the closure is important as preventing any possibility of losses or spilling and at the same time for preserving for an indefinite period the apparatus with its filler in condition for refreezing and reuse (over and over again), this being an important element of my invention in its most perfect form.

In Fig. 3 there are shown three containers to be frozen, or to be kept frozen after the process of freezing is accomplished. Under the vessels is a heat conducting slab through which the refrigerating mixture is circulated by a proper pipe, and the slab itself being indicated by the number 20 and a pipe by number 21. Any similar device may be employed. The containers rest in heat conduction upon this slab 20 and are surrounded by a non-conducting cover or jacket 22 covering them in on all sides during freezing. This jacket is removable for access to the containers so that they may be selected for use. In fact, Fig. 3 typifies a refrigerator cupboard or closet for storage or maintenance for one or more of the containers such as Fig. 1 in condition for immediate use, as when a confectioner supplying a number of customers with ice cream at certain times on order is required to ship or transport it in an unmelted condition, in which case he selects the proper sized container for receiving the ice cream and preferably wraps it up or places it in an outside protecting cover, as in Fig. 2, and ships it to the customer in that state. In this way he is able to fill orders with a neatness and dispatch, which up to the present has been impossible, and to avoid all of the disagreeable features of jacketing with freezable mixtures, which are liable to spill and which are unsightly, and which, in fact, may leak into the ice cream container itself, which is often immersed in the briny mixture.

It is to be understood that modifications not departing from the conditions and arrangements herein mentioned in any essential respect may be made without in any sense departing from the spirit and scope of the present invention.

What I claim as new and desire to secure by Letters Patent of the United States, is:—

1. A receptacle for preserving frozen products, comprising a container, an adjacent sealed vessel in good thermal relation to said container having an empty space, said sealed vessel containing a liquid congealing at a temperature a few degrees lower than the softening point of the frozen product, and thermal insulation outside the container and adjacent vessel, whereby the ingress of climatic temperature is retarded.

2. A receptacle containing a frozen product, such as ice cream, a sealed expansion space or vessel adjacent thereto containing a frozen solution having a liquefaction point a few degrees below the softening point of the ice cream, thereby maintaining for a long time its normal frozen state, and a jacket of low heat leakage surrounding the whole.

3. A receptacle for preserving a product comprising a container, a removable refrigerant vessel adjacent to said container but spaced sufficiently therefrom to provide a convection space there-between yet in good thermal relation to said container, said vessel containing a liquid congealable at a temperature a few degrees below the perishable temperature of the product, and thermal insulation outside said vessel.

4. A receptacle for preserving a product, comprising a container, a plurality of adjacent refrigerant vessels spaced sufficiently therefrom to provide a convection space there-between yet in good thermal relation to said container, said vessels containing a liquid congealable at a temperature lower than substantially 32° F. and having a predetermined liquefaction temperature a few degrees lower than the softening temperature of the product, said vessels being individually removable, and thermal insulation outside the container and said vessels whereby ingress of climatic temperature is retarded.

5. A thermally insulated receptacle containing a perishable product, a plurality of refrigerant vessels in good thermal relation thereto yet spaced sufficiently therefrom to provide a convection space, said vessels being partially filled with a solution congealable at a temperature lower than substantially 32° F. and having a liquefaction temperature a few degrees lower than the normal preservation temperature of said product, and said vessels being individually removable for freezing the solution therein.

6. A receptacle containing a product to be preserved, a refrigerant solution congealable at a temperature below substantially 32° F. and having a liquefaction temperature a few degrees below the deterioration temperature of said product, a removable sealed vessel containing said solution and non-rupturable by the expansion of the latter on freezing, said vessel being in good thermal relation to said product yet spaced sufficiently therefrom to provide a convection space therebetween, and a jacket of low heat leakage in operative relation to the whole, whereby ingress of climatic temperature is retarded and whereby the product is maintained for a long time in its normal state of preservation.

ELIHU THOMSON.